April 16, 1968 H. W. COLE, JR 3,377,840
APPARATUS FOR DETECTING DENSITY OF FLUIDS
Filed April 22, 1966 3 Sheets-Sheet 1
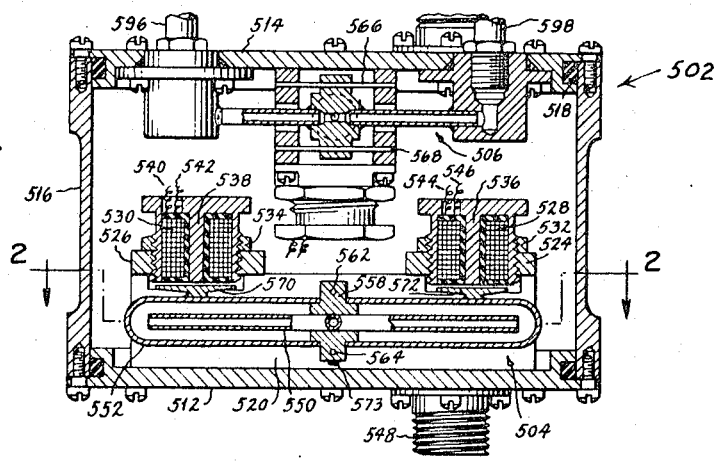
Fig. 1.
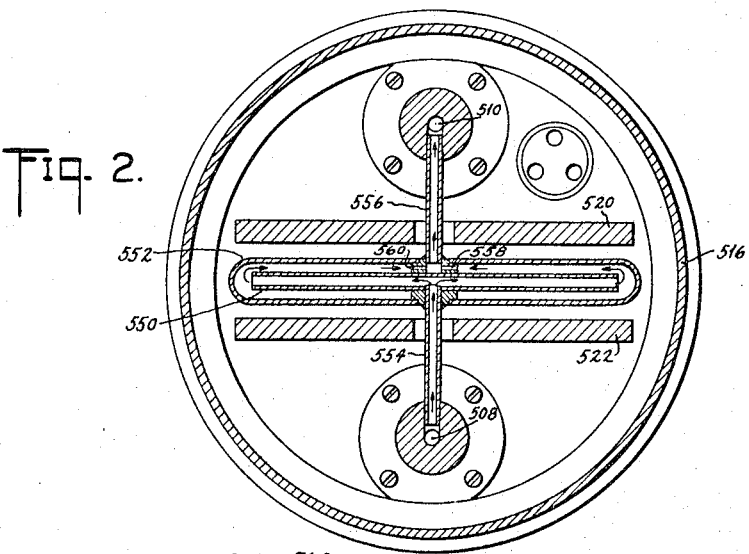
Fig. 2.
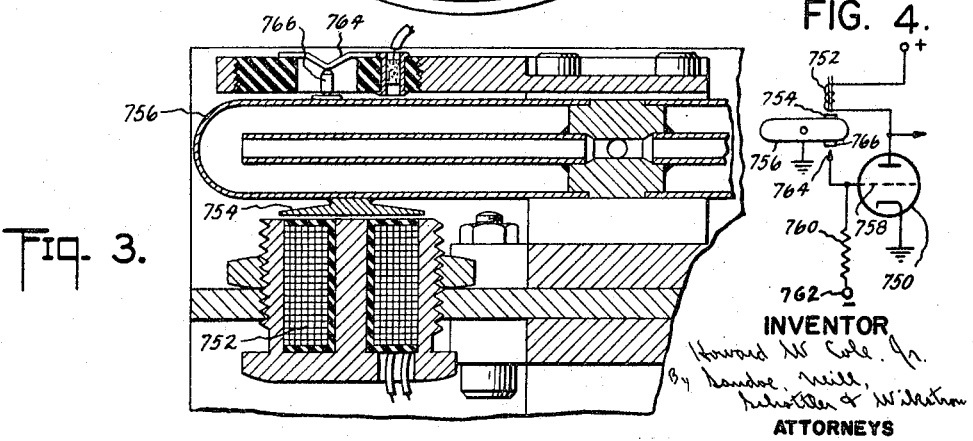
Fig. 3.
FIG. 4.
INVENTOR
Howard W Cole, Jr.
By Sandoe, Neill,
Schlottler & Wilson
ATTORNEYS April 16, 1968 H. W. COLE, JR 3,377,840
APPARATUS FOR DETECTING DENSITY OF FLUIDS
Filed April 22, 1966 3 Sheets-Sheet 2
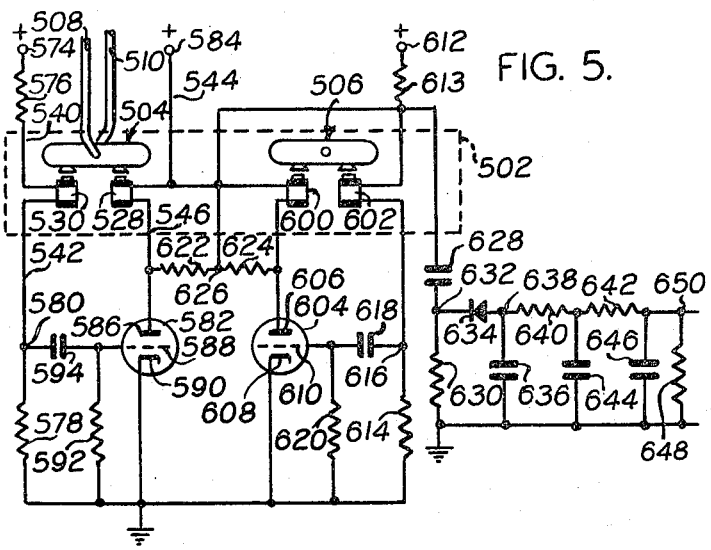
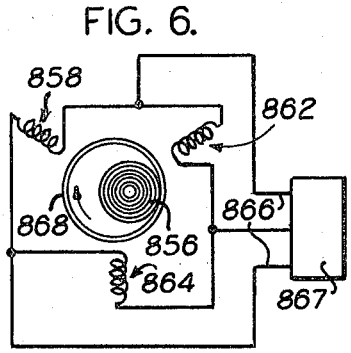
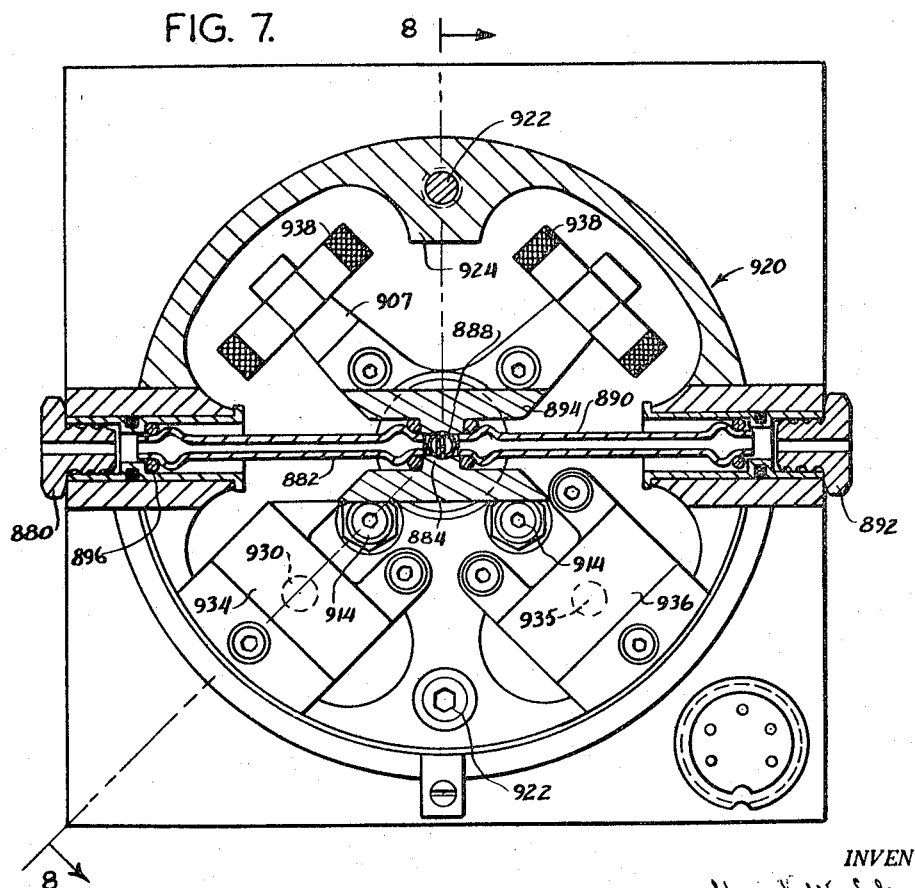
INVENTOR.
Howard W. Cole, Jr.
BY
ATTORNEYS April 16, 1968  H. W. COLE, JR  3,377,840
APPARATUS FOR DETECTING DENSITY OF FLUIDS
Filed April 22, 1966  3 Sheets-Sheet 3
FIG. 8.
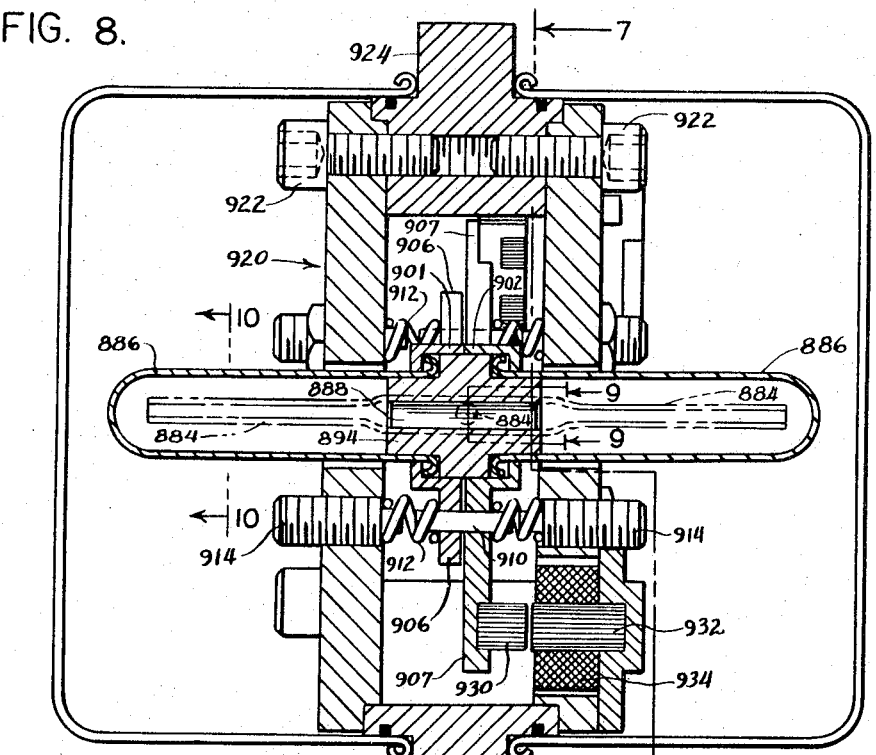
FIG. 9.
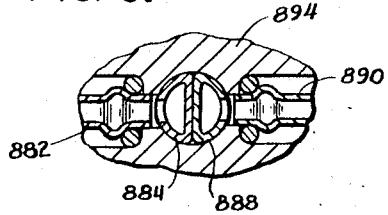
FIG. 10.
FIG. 11.
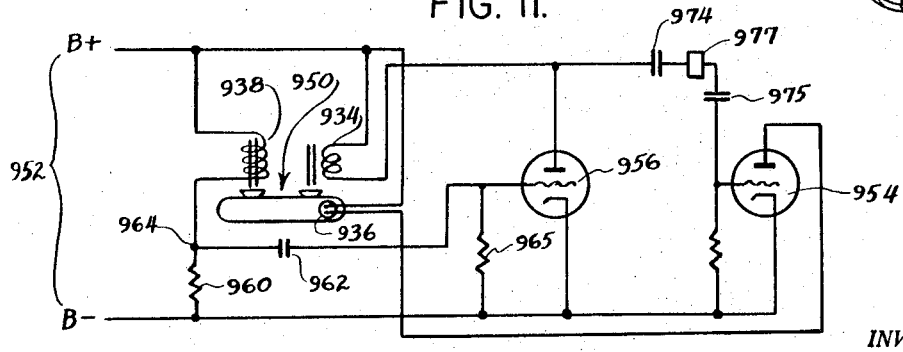
INVENTOR.
Howard W. Cole Jr.
BY Sandoe, Neill,
Schottler & Wilstrom.
ATTORNEYS

United States Patent Office 3,377,840
Patented Apr. 16, 1968

3,377,840
APPARATUS FOR DETECTING DENSITY
OF FLUIDS
Howard W. Cole, Jr., 12 Vale Drive,
Mountain Lakes, N.J. 07046
Continuation-in-part of application Ser. No. 81,824,
Jan. 10, 1961. This application Apr. 22, 1966, Ser.
No. 544,517
14 Claims. (Cl. 73—32)

ABSTRACT OF THE DISCLOSURE

The densimeter consists of two horizontally opposed liquid containers supported at their juncture by an integral supply tube extending perpendicular to the container tubes and also lying in a horizontal plane. The container tubes have static and dynamic balance about the supply tube. Electromagnetic means cause the containers to pivot about the supply tube and move in an angular or orbital path. The frequency of oscillation of the tubes is measured to indicate density. In one embodiment, signals from two tubes, one containing a standard fluid and the other a test fluid, are compared to determine density.

Objects and brief description of the invention

This application is a continuation-in-part of application Serial No. 81,824, filed Jan. 10, 1961, now Patent Number 3,248,942; and that application was a continuation in part of the application that issued as Patent 2,974,525, dated Mar. 14, 1961.

One object of this invention is to provide apparatus for precisely measuring specific gravity of fluids and other materials. The novel specific-gravity-measuring apparatus to be described herein is useful per se; and also may, with unique advantages, act as the density-compensating component of flow measuring systems.

It will be understood herein that the term "fluid" is intended to be broad enough to include liquids, gases, material which is partly liquid and partly gaseous, material which is flowable although including small solid or semi-solid particles, or various combinations of the same.

There are described herein several embodiments of apparatus for measuring the specific gravity or density of fluids or other material. A feature of certain of these embodiments is that they do not depend upon the force of gravity, and their accuracy is not affected by any variations in the value of gravitational force or other accelerating forces to which the apparatus may be subjected. This feature is particularly advantageous when the apparatus is being used in aircraft, which may subject it to strong accelerations during the measurments, without affecting its performance. Certain embodiments of the specific gravity or density measuring apparatus include the use of a hollow body, for example a tube, or a tube having hollow balls on its ends, for containing the material to be tested.

The hollow body is mounted for variable positioning, or in some embodiments oscillation, about a transverse axis. An important feature is that the body is balanced about this axis so that the pull of gravity or the force of accelerations of the entire mechanism in any direction will not affect the position or movement of the hollow body with respect to the axis. In one arrangement, the hollow body is caused to oscillate about this axis, with the aid of an intermittent driving force and a restoring force, and the frequence of oscillation will depend upon and be an indication of the specific gravity of the material in the hollow body.

Further objects, features, advantages and embodiments of the invention will appear from the more detailed description set forth by way of illustration, which will now be given in conjunction with the accompanying drawings.

Brief description of the drawings

FIGURE 1 is a sectional view of apparatus made in accordance with this invention for determining density of a fluid;

FIGURE 2 is a sectional view of the apparatus shown in FIGURE 1, along the broken sectional plane 2—2;

FIGURE 3 is a fragmentary sectional view of a modified form of the apparatus shown in FIGURES 1 and 2;

FIGURE 4 is a diagrammatic view showing a combination for controlling the apparatus of FIGURE 3 and for deriving an output voltage from it;

FIGURE 5 is a wiring diagram for the apparatus shown in FIGURES 1 and 2;

FIGURE 6 is a diagrammatic view of still another form of apparatus for measuring density or specific gravity, also depending upon centrifugal force;

FIGURE 7 is a sectional view through another modified construction of apparatus for determining specific gravity.

FIGURE 8 is a sectional view taken on the line 8—8 of FIGURE 7;

FIGURES 9 and 10 are sectional views taken on the lines 9—9 and 10—10, respectively, of FIGURE 8 and FIGURE 11 is a wiring diagram for the apparatus shown in FIGURES 7-10.

Detailed description of the invention

One feature of the density or specific gravity measuring apparatus to be described at this point is that it does not depend upon the force of gravity, and its accuracy is not affected by any variations in the value of gravitational force or other accelerating forces to which the apparatus may be subjected.

The apparatus includes a hollow member, which may for example, be elongated and of tubular shape, for containing the fluid to be tested. The hollow member is supported and journaled for oscillation about an axis passing transversely through the middle of the hollow member. The hollow member is in dynamic and static balance about this axis. This arrangement is of considerable advantage in giving the apparatus the desirable property of being unaffected by the force of gravity or variations in accelerating forces to which the apparatus may be subjected.

Another feature of one embodiment is that, in addition to the first hollow member which carries the fluid of unknown specific gravity, there is provided another, exactly similar hollow member, for carrying a fluid of known specific gravity. For each hollow member there are means, for example, a spring, providing a force for urging it to return to its equilibrium position when it is deflected about its axis of oscillation, and means, for example, a solenoid, for intermittently applying a deflecting force to it, to cause it to oscillate about that axis. The two hollow members are supported in a common frame. Each hollow member and its assembly for deflecting, restoring and supporting it is identical in construction to the other. Each of the hollow members will oscillate at a frequency determined by the specific gravity of its fluid.

By the use of electrical pickup means, there are generated two electrical signals corresponding in frequency respectively to the frequencies of oscillation of the two hollow members. These two electrical signals are beat against one another, to derive a signal the frequency of which is related to the difference in frequency of oscillation of the two hollow members. Indicating means are provided for indicating a value proportional to this difference frequency, which in turn is related to the specific gravity of the fluid being measured.

In FIGURE 1, there is shown schematically a specific gravity sensing unit 502, including a first hollow member or tube assembly 504, for containing the fluid to be measured, and a second hollow member or tube assembly 506, for containing a fluid the specific gravity of which is known. Fluid is supplied to the tube assembly 504 through a conduit 508. FIGURES 2 and 5 are returned from the tube assembly through a conduit 510. It will be understood that when fluid flows through the assembly 504 in parallel with supply pipe, it is necessary to provide sufficient pressure drop between the point where the conduit 508 meets the supply pipe and the point where the conduit 510 meets the supply pipe, to assure that the fluid in the tube assembly 504 is a representative sample of the fluid passing through the supply pipe.

The tube assembly 504 is shown toward the bottom of FIGURE 1 and also in FIGURE 2, and the tube assembly of 506 is shown toward the top of FIGURE 1.

There is provided a lower base 512, and upper base 514, and a circular housing 516, screwed together, and provided with rubber O-rings 518, for sealing purposes.

It may be observed generally that the assembly associated with the tube assembly 504, in the lower half of FIGURE 1 is identical with the assembly associated with the tube assembly 506 in the upper half thereof. The two assemblies are mounted so that the tube assembly 506 runs perpendicular to the major plane in which the tube assembly 504 lies, this being the plane of the paper in FIGURE 1.

There are provided a pair of mounting rails 520 and 522. These rails carry coil mounting plates 524 and 526 which in turn carry coils 528 and 530, held in place by lock nuts 532 and 534. The coils are provided with cores 536 and 538. The coil 530 terminates in leads 540 and 542. The coil 528 terminates in leads 544 and 546. The various electrical leads are brought in through a connector 548.

The tube assembly 504 comprises an inner feed tube 550, an outer measuring tube 552, a supply and torsion tube 554 communicating with the inner feed tube and discharge and torsion tube 556, which communicates with the measuring tube. There is provided a hub 558 which serves several purposes. It aids in supporting the feed tube 550 and the measuring tube 552 with respect to each other and with respect to the torsion tubes 554 and 556. It is shaped to include a duct 560, providing communication between the interior of the measuring tube 552 and the discharge torsion tube 556. Carried by the rails 520 and 522 are a pair of wire springs 562 and 564. In the upper half of FIGURE 1 a similar arrangement is shown, and because of the orientation, may be seen clearer. The springs for the upper part of FIGURE 1 are 566 and 568. The hub 558 has portions which include bores for receiving the springs 562 and 564.

The tube assembly 504 in FIGURE 1 may be seen to be mounted for oscillation in the plane of the paper, and the springs 562 and 564 serve to provide a restoring force when they are bent by the hub 558, which occurs when the tube assembly is deflected about its axis of oscillation established by the torsion tubes 554 and 556. Soldered to the measuring tube 552, toward its lefthand end, in a position to cooperate with the coil 530, is an armature 570.

A similar armature 572 is carried by the righthand end of the tube 552, in a position to cooperate with the coil 528. The coil 528 is a driving coil, which serves intermittently to attract the armature 572 and hence to transmit a driving force to the tube assembly 504, for producing oscillatory motion of it. The coil 530 is a pickup coil, and in response to motion of the armature 570 by the measuring tube 552, there are produced variations in the reluctance of the magnetic circuit for this coil.

One or more counterweights, for example, solder, are applied to each oscillating tube assembly, of sufficient magnitude and at proper points to balance the assembly about its axis of oscillation. Such a counterweight is shown in FIGURE 1 at 573. The balance should be sufficiently good to assure that, under conditions of acceleration to which the apparatus will be subjected including linear accelerations, vibrations, and other accelerations, the output signal from the pickup coil will not be affected enough to give a significantly erroneous indication. For this purpose it is usually sufficient to provide static balance. In addition, it is desirable to provide dynamic balance. Such conditions of balance are attained by the application of counterweights, such as the solder.

Aside from the use of counterweights to provide balance, they are also used to tune the tube assemblies, that is to adjust each one to a desired natural resonant frequency, and to give the two assemblies, 504 and 506, identical characteristics in this respect. As shown in FIGURE 5, the coil 530 is energized from a source 574 of positive unidirectional potential, through a resistor 576, and a resistor 578, connected to ground. At a point 580 at the upper end of the resistor 578 there will appear a unidirectional component of potential, because of biasing affect of the current from the source 574. In addition, because of the variations in the reluctance of the magnetic circuit of the coil 530, and the consequent variations in the inductance of this coil, there will appear at the point 580 an alternating component of potential having a repetition frequency the same as the frequency of oscillation of the tube assembly 504.

The driving coil 528 is connected in the anode circuit of a vacuum tube 582, which is energized from a source 584 of unidirectional voltage. The tube 582 includes an anode 586, a control grid 588 and a cathode 590, the cathode being connected to ground. The grid 588 is biased to the cathode potential by a resistor 592, and is connected via a coupling condenser 594 to the point 580. It may be seen that the amplifier tube 582, the oscillating tube assembly 504 and the connections thereto comprise an electro-mechanical oscilaltor. That is, variations in the anode current of the tube 582 will produce variations in the position of the tube assembly 504, because of the solenoid action of the coil 528, and oscillatory motion of the tube assembly 504 will produce variations in the current through the pickup coil 530, and consequently variations in the voltage applied to the grid 588 of the tube 582.

Such a system has a natural resonant frequency which depends upon a number of factors. One of the factors upon which it depends is the restoring force supplied by the stiffness of the torsion tubes 554 (FIGURE 2) and 556, and the stiffness of the springs 562 and 564. One of the principles upon which the operation of the apparatus depends is that the natural frequency of oscillation depends also upon the mass of the oscillating mechanical components, and this in turn depends largely upon the specific gravity of the fluid being measured. The walls of the oscillating tube assembly are made thin so that the mass of the fluid is the major portion of the total oscillating mass.

It will therefore be seen that the current through the amplifier tube 582 (FIGURE 5) will vary at a frequency determined by the specific gravity of the fluid passing through the supply pipe.

A fluid of known specific gravity, in the embodiment shown in FIGURES 1 and 2 is placed in the vibrating tube assembly 506. The conduits 596 and 598 which communicate with the oscillating tube assembly 506 are then sealed. The oscillating tube assembly 506 and its associated circuits are exactly like the oscillating tube assembly 504 and its associated circuits. The tube assembly 506 is oscillated by a coil 600 and applies a signal to a pickup coil 602, the coils having armatures affixed to the tube assembly. The coil 600 is connected in the anode circuit of a vacuum tube 604 having an anode 606, a cathode 608 and a grid 610. The pickup coil 602 is energized from a source 612 of unidirectional potential, through a resistor 613, and is connected in series with a resistor 614, the bottom end of which is connected to ground. A point 616 at the top end of the resistor 614 is connected via condenser 618 to the grid 610, which is biased to ground by a resistor 620. The voltage at the anode 606 will vary at a constant frequency determined by the known specific gravity of the reference fluid in the tube 506. It will be understood that amplifying means other than a vacuum tube can be used, such as transistors and magnetic amplifiers.

There is provided in FIGURE 5, a network, including a resistor 622 and a resistor 624 connected in series between the anode 586 and the anode 606. The resistors 622 and 624 are of the same value. The midpoint 626 of these resistors will have a varying signal whose frequency is equal to the sum or difference of the signals at the anodes 586 and 606.

This varying signal from the point 626 is applied via a coupling condenser 628 across a resistor 630, and appears at a point 632, at the top of this resistor. From this point the signal is applied to a rectifier 634, oriented in such a direction as to allow electrons to pass only from left to right. The righthand electrode of this rectifier is coupled to ground via condenser 636. A point 638 connected to the upper plate of this condenser is connected to a filter comprising the condenser 636, series resistors 640 and 642 and shunt condensers 644 and 646. In parallel with the condenser 646 is a resistor 648, which in conjunction with the resistors 640 and 642 comprises the ground return for the rectifier 634 and the point 638. The frequency components of the voltage at the point 650 would, except for the filter, include not only the frequencies at which the tubes 504 and 506 oscillate, but also their sum and difference frequencies. The filter is of such circuit constants as to reject the relatively high frequencies of oscillation of the tubes 504 and their sum frequency, but to pass the difference frequency. The upper end of the resistor 648 is identified as point 650.

It will be recalled that the voltage at the point 650 varies at a frequency equal to the difference in the frequencies of oscillation of the oscillating tubes 504 and 506. This voltage at the point 650 is more or less sinusoidal in nature, and it can be used to operate a gage, meter, compensator, or any other means which it is desirable to have responsive to specific gravity.

Another arrangement for driving the oscillating tube assembly is illustrated in FIGURES 3 and 4. As shown in FIGURE 4 there is provided a vacuum tube 750 which serves somewhat the same function as the tube 582 of FIG. 5. A coil 752 is connected in the anode circuit of the vacuum tube, and when there is a large current through the vacuum tube, the coil 752 attracts an armature 754 carried by the measuring tube 756. The measuring tube 756, together with its inlet and discharge torsion tubes for providing a restoring force, is of the same construction as the previously described measuring tubes of FIGURES 1 and 2, such as 552, the only difference being in the driving arrangement. Restoring springs similar to 562 and 564 may be used, in addition to the restoring means provided by the torsion tubes, but are not shown in FIGURE 3, for simplicity.

The control grid 758 of the vacuum tube 750 is normally biased via a resistor 760 to a negative potential derived from a terminal 762, sufficiently negative to prevent conduction through the tube 750, or to reduce the current to a value so small that the coil 752 is unable to overcome the restoring force provided by the torsion tubes and springs. The control grid is also connected with a contact 764, which is positioned to be engaged and disengaged by a contact 766 carried by the tube 756 as it oscillates. The contact 766 is grounded through the tube 756 and its frame. The contact 764, as shown in FIGURE 3, is adapted to yield somewhat when the advancing contact 766 engages it and continues to advance for a short distance. For this purpose, the contact 764 is of spring construction and also its lefthand end as shown in FIGURE 3 may lift up somewhat and pivot about its righthand end when the apparatus is in a quiescent condition, that is, when the coil 752 is not energized, the spring force of the torsion tubes and the springs serves to position the assembly so that the contact 766 is in engagement with the contact 764.

The operation of the apparatus, as may best be understood from FIGURE 4, is that, when the circuit is energized, since the grid is connected to ground or cathode potential via the contacts 764 and 766, the vacuum tube 750 conducts strongly, and the resulting current through coil 752 attracts the armature 754 and thereby moves the measuring tube 756 far enough to cause the contact 766 to disengage the contact 764. When this happens, the potential of the grid drops to its negative bias potential, reducing the current through the coil, and allowing the measuring tube to be restored by the spring force to its original position, and the cycle is thus repeated, causing the measuring tube to oscillate at a frequency determined by the density of the fluid in it. The output signal may be derived from the anode of the vacuum tube 750 and used as described in connection with tubes 582 and 604 of FIG. 5. The driving arrangement of FIGURES 3 and 4 may be used for both measuring tubes of a double tube arrangement like that shown in FIGURE 5. It will be understood that the tube assemblies of FIGURES 3 and 4 are counterbalanced for static and in some cases dynamic balance about their axis of oscillation, by means of counterweights.

FIGURE 6 shows still another arrangement for measuring specific gravity. This apparatus makes use of a measuring tube assembly like that shown in FIGURES 1 and 2, for example, tube assembly 504. An end view of such a tube is shown in FIGURE 6, the tube being represented by the numeral 856. In FIGURE 6 the tube 856 is driven in a manner quite different from the manner in which the tube assemblies are driven in FIGURE 1. It will be understood that the tube 856 is, however, supported by torsion tubes in exactly the same manner as was the tube assembly of FIGURE 5. In FIGURE 6, there is applied to one end of the tube 856 a force adapted to give it an orbital motion. For this purpose, there are provided three coils, 858, 862 and 864, oriented 120 degrees apart physically, these coils being connected together in a star or delta arrangement, the latter being shown in FIGURE 6. A three-phase current is supplied to these coils through the leads 866, from a source 867.

The tube 856 may be assumed to be of ferromagnetic material, adapted to be influenced by the magnetic field supplied by the three coils 858, 862 and 864. The tube may have a tough outer plastic coating. Surrounding the tube 856 is a cylinder 868, for example, of plastic, which does not shield the tube 856 from the magnetic field of the coils. The coils are mounted symmetrically with respect to the cylinder 868, but the tube 856 is in a slightly off-center position. The rotating magnetic field will translate the end of the tube 856 around an orbital path, that is, will give angular movement to the end of the tube, causing the tube to pivot about its midpoint.

The resulting centrifugal force effect will, as the angular speed increases, tend to cause the end of the tube to be displaced outwardly from the axis of the cylinder 868. The outward displacement mentioned will continue until the tube 856 engages the cylinder 868, which produces a braking effect, limiting the speed. The ultimate angular speed will be larger when the tube 856 is filled with a light fluid, than when it is filled with a heavy fluid. This is because a heavy fluid will, at a slower speed, produce a great enough centrifugal force to overcome the restoring force of the spring means provided by the torsion tubes, while a lighter fluid will require a greater speed to do so.

To derive an output signal, a permanent magnet is attached to the opposite end of the tube 856, and a pickup coil arranged in a position to receive the varying flux from the magnet as it is moved about an orbital path. The output signal will have a frequency determined by the density of the fluid, and may be used in the same way as has been described heretofore in connection with similar signals, to produce an indication of density.

The apparatus of FIGURE 6 may be of the dual type, in which one apparatus includes a fluid to be tested and one an unknown fluid. The resulting output signals will be compared in frequency as shown in FIGURE 5.

FIGURES 7–10 show another modification of the invention for determining the density or specific gravity of a fluid. The fluid to be tested is supplied through an inlet fitting 880 and conduit 882 to the mid portion of an inner tube 884. Fluid discharges from both ends of this inner tube 884 and into sample tubes 886. The fluid flows from the ends of the inner tube 884, back along the outside of this inner tube and into the open ends of another and shorter inner tube 888 from which the fluid flows through a conduit 890 to an outlet fitting 892. Both of the inner tubes 884 and 888 are secured to a center hub 894, and these inner tubes 884 and 888 have their mid portions shaped to fit into a circular opening through a hub 894, as shown in FIGURE 9. The conduits 882 and 890 have flexible connections with both the hub 894 and the inlet and outlet fittings 880 and 892. In the illustrated construction, these flexible connections are universal joints formed by having enlarged-diameter portions of the conduits contact with sealing rings 896 surrounding the end portions of the conduits which extend into both the center hub 894 and the inlet and outlet fittings 880 and 892, respectively. The other modifications of the invention can have similar universal or flexible joints for connecting the oscillating tube assemblies with relatively stationary fluid passages.

The center hub 894 includes two shells 901 and 902 that clamp lips of opposite end portions of the sample tubes to the center hub 894. These shells 901 and 902 are clamped together and constitute, with the inner tubes 884 and 888, and the sample tubes 886, a unitary assembly for holding the fluid to be tested. Since the fluid flows constantly through this assembly, the test for specific gravity is always made on the fluid flowing at the time of the determination.

There are lugs 906 and 907 extending from the shells 901 and 902, respectively, at angularly-spaced locations around the shells. The entire sample tube assembly is supported by these lugs 906 and 907 which have studs 910 projecting from opposite sides of the flanges.

These extensions of the studs 910 project into helical springs 912 which are, in turn supported from screws 914 having reduced end portions which project into the spring 912. The screws 914 thread through openings is a fixed frame 920. These screws 914, can be rotated one way or the other to change the compressive force on the springs 912.

Opposite sides of the frame 920 are connected together by screws 922 threaded into a mid portion 924 of the frame. An outer housing 926 fits over the frame 920 on both sides of the mid portion 924.

There is an armature 930 connected to each of the downwardly-extending lugs 907. One of the armatures 930 is located in front of a core 932 surrounded by a magnetizing coil 934. The other armature 930 is located in front of a core 935 surrounded by a coil 936. The cores 932 and 935, and coils 934 and 936 are integrally connected to the fixed frame 920. Energizing of the coils 934 and 936 causes the armature 930 to be attracted to these cores.

The upwardly-extending lugs 907 project through coils 938 (FIGURE 7) and these coils are also attached to the stationary frame 920.

Energizing of the coil 934 only, with a pulsating current causes the sample tube assembly to oscillate in a plane with the direction of pull of that coil. Energizing of the coil 936 only, oscillates the sample tube assembly in a plane with the direction of pull of the magnet coil 936, and this plane is substantially at right angles to the plane of pull of the other coil 934. When the coils 934 and 936 are energized in rapid succession, the combined forces of these coils urging oscillation in different planes cause an orbital movement of the sample tubes. The natural resonance of the sample tube assembly depends upon the spring rate of the spring 912 and the mass of the assembly, and it is, therefore, responsive to changes in the specific gravity of the fluid in the sample tube assembly.

The lugs 907 in unison with the rest of the assembly and their movement effects the magnetic fields of the coils 938 and produces signal impulses in the circuits of the coils 938.

FIGURE 11 shows the apparatus for oscillating the sample tube assembly. The assembly is designated generally by the reference character 950. The coil 934 is connected across opposite sides B+ and B— of a power line 952 through a tube 956. The coil 936 is connected across the power line 952 through a tube 954.

The coil 938 is connected across the power line 952 in series with a resistor 960. The grid of the tube 956 is connected, by a coupling condenser 962, with a point 964 of the circuit of the coil 938 between that coil and the resistor 960. The coil 938 is always energized. Another resistor 965, for biasing the grid of tube 956, is connected to the negative side of the power line.

Current flows through the coil 934 and the tube 956 which is initially conducting. There is another circuit in parallel with the tube 956 and which includes condensers 974 and 975, a phase shifter 977 and a resistor 969. The grid of the tube 954 is connected with this parallel circuit. When the tube 956 is conducting, the bias on the grid of the tube makes that tube nonconducting and thus the coil 936 is not energized.

As soon as the coil 934 attracts the sample tube assembly and causes it to move, the lug 907 moves as a unit with the sample tube assembly. This disturbs the field of the coil 938 and changes the voltage of the circuit of the coils 938 and 960 with resulting change in the bias of the grid of the tube 956. This change in grid bias cuts off the flow of current through the tube 956 and de-energizes the coil 934.

The voltage change in the circuit of the coil 934 changes the bias on the grid of the tube 954 so that the tube becomes conducting. This energizes the coil 936 which attracts the sample tube assembly to produce the orbital movement. The change in movement of the lug 907 causes the grid of the tube 956 to again have its original bias; the tube 956 again becomes conducting; and the cycle is repeated.

This time required for the oscillations of the sample tube assembly depends upon its mass, and is, therefore, proportional to the specific gravity of the fluid in the sample tube assembly. The frequency of the oscillations are used with suitable detection equipment to indicate specific gravity. A specific gravity indicator 980 is shown diagrammatically connected with one of the tube circuits. This indicator 980 is merely representative of means responsive to the frequency of the oscillations for indicating specific gravity.

The nutating (orbital) motion of the FIGURE 7–10 modification permits the density detector to weigh compressible fluids such as mixtures of air and water. Such compressive or elastic media will not be "coupled" (all parts of the fluid made to have the same motion as the sample tube) to the sample tube if the tube moves sinusoidally in one plane when the tube nutates. The fluid is acted upon by centrifugal force which is uni-directional acceleration outward in a radial direction and then di-directional in a single plane. Therefore if the fluid remains in the tube for a period of time long enough to allow all parts of the fluid to achieve the same motion as the sample tube, the fluid can be accurately weighed regardless of its compression.

The preferred embodiments of the invention have been illustrated and described, but changes and modifications can be made, and some features can be used in different combinations without departing from the invention as described in the claims.

What is claimed is:

1. Apparatus for measuring specific gravity, comprising a hollow member for receiving the material to be measured, supporting means for the hollow body and on which the hollow body is movable angularly about a center, said hollow member together with said material therein being in dynamic and static balance about said center and having an equilibrium position, means for applying a restoring force tending to restore said hollow member to the equilibrium position when deflected angularly therefrom about said center, means for applying periodically a force to said hollow member for causing it to move angularly about said center from said equilibrium position at a frequency related to the specific gravity of said material therein, and frequency-responsive means, responsive to the frequency of angular movement of said hollow member, adapted to produce a definite response indicative of the specific gravity of said material in said hollow member.

2. The apparatus described in claim 1 characterized by a pair of elongated hollow tubular members, one for containing a reference fluid of know specific gravity and the other for containing a fluid to be tested, each of said tubular members being mounted for angular movement about a neutral equilibrium position, spring means for restoring each of said tubular members to its neutral position, electro-magnetic means for angularly moving each of said tubular members at a frequency determined by the specific gravity of the fluid therein, electro-magnetic pick-up means for deriving two signals, corresponding respectively in frequency to the frequency of angular movement of said tubular members, and means for comparing the frequencies of said signals.

3. The apparatus described in claim 1 characterized by the hollow member including a sampling tube assembly, conduits through which fluid flows to and from the sampling tube assembly, the means for applying force including electro-magnetic means for moving the tube assembly, other means for controlling the excitation of the electro-magnetic means, said other means including a part connected to and movable with the sampling tube assembly for shutting off the power to the electro-magnetic means when the sampling tube assembly is moved by said electro-magnetic means, and said other means including also a circuit to said electro-magnetic means closed by return of the sampling tube assembly to its original equilibrium position whereby the electro-magnetic means is energized repetitively in response to movement of the sampling tube assembly which is in turn proportional to the mass of said assembly.

4. The apparatus described in claim 3 and in which the excitation to the electro-magnetic means is controlled by the movement of an armature related to the movement of the sampling tube assembly, and there is a pick-up coil related to said armature, and said movement produces an electric current flow in the pick-up coil, and there is an amplifying means to which said electric current is applied to produce the aforementioned excitation to the electro-magnets, and there is an electro-mechanical oscillator whose frequency of oscillation is proportional to the density of the fluid contained within the sampling tube assembly and the spring rate of the sampling tube assembly support means.

5. The apparatus described in claim 3 and in which the apparatus has a support on which at least a portion of the sampling tube assembly is movable in an orbit, and the electro-magnetic means includes two magnets located in positions to pull the sampling tube assembly in directions in different planes, and said other means supply energy to the magnets with the supply of energy to one magnet out of phase with the supply of energy to the other magnet, whereby said magnet impart orbital movement to the sampling tube assembly.

6. The assembly described in claim 5 and in which the circuits of both of the magnets include switch means that have triodes with the voltage on the grids of the triodes controlled by movement of the sampling tube assembly.

7. The apparatus described in claim 6 and in which the magnets are supplied with energy from the same source, and there is phase shifter in the circuit of one of the magnets so that the maximum pull of the different magnets on the sampling tube assembly comes at different times.

8. The apparatus described in claim 1 characterized by the hollow member including a sampling tube assembly, an inlet fitting, an outlet fitting, both of the fittings being at fixed locations, a conduit leading from the inlet fitting to one part of the sampling tube assembly, another conduit leading from another part of the sampling tube assembly to the outlet fitting, and flexible joints at both ends of both conduits connecting the conduits with the fittings and the sampling tube assembly.

9. The apparatus described in claim 8 and in which the sampling tube assembly includes a hub portion with a circular opening therethrough, two tubes extending through said opening and each of which is of semi-circular cross section and of a size to fit substantially one half of said opening, one of the tubes connecting with the conduit from the inlet fitting and the other of the tubes connecting with the conduit from the outlet fitting, and both of said tubes having at least one end open, and a shell enclosing a chamber in which the open ends of both of the tubes are enclosed.

10. The assembly described in claim 9 and in which the tubes extend in opposite directions from the hub portion and both tubes are open at both ends, and there are two different shells enclosing chambers on opposite sides of the hub portion, each of the shells having a flange at one end by which it is clamped to a part of the sampling tube assembly.

11. The assembly described in claim 8 and in which there are resilient supporting means that carry the sampling tube assembly, and there are electro-magnetic means that exert forces in directions in different planes to give at least a part of the sampling tube assembly an orbital movement.

12. The assembly described in claim 11 and in which there are armature portions connected with the sampling tube assembly, and there are electro-magnets located on different sides of the sampling tube assembly and confronting the armature portions, the electromagnets extending in directions in angular relation to one another whereby said electro-magnets pull the sampling tube assembly in different directions, and means for applying repetitive excitation to each of the electromagnets, out of phase with the other electro-magnet, to impart orbital movement to the sampling tube assembly.

13. In apparatus for measuring the density of a material, a relatively stationary supporting structure, a hollow container for said material, means connecting the container with the supporting structure and including a passage through which the material is supplied to the hollow container, electro-magnetic means for rotating at least a portion of said hollow container with respect to the supporting structure and about an orbital path, so as to produce a centrifugal force related to the density of said material in the container, the means connecting the container with the supporting structure including also spring means operably connected between the supporting structure and the container in position to oppose said centrifugal force, and the resulting displacement of said container, and means for measuring the frequency of said rotation as an indication of the density of the material in the container.

14. The apparatus described in claim 13 whereby said spring means responsive to displacement comprises braking means effective when said centrifugal force causes said container to move outwardly a predetermined distance in opposition to the force of said spring so as to limit said rotation to a repetition frequency determined by the density of the material therein.

References Cited

UNITED STATES PATENTS

| 1,045,957 | 12/1912 | Dicks | 138—111 |
| 1,823,919 | 9/1931 | Smith | 138—111 |
| 2,635,462 | 4/1953 | Poole et al. | 73—32 |
| 2,974,525 | 9/1953 | Cole | 73—32 |
| 3,248,942 | 5/1966 | Cole | 73—32 |

RICHARD C. QUEISSER, *Primary Examiner.*

J. D. SCHNEIDER, *Assistant Examiner.*